(12) United States Patent
Curatolo et al.

(10) Patent No.: US 7,502,916 B2
(45) Date of Patent: Mar. 10, 2009

(54) PROCESSING ARRANGEMENT, MEMORY CARD DEVICE AND METHOD FOR OPERATING AND MANUFACTURING A PROCESSING ARRANGEMENT

(75) Inventors: Giacomo Curatolo, Unterhaching (DE); Ofir Gilad, Munich (DE)

(73) Assignee: Infineon Technologies Flash GmbH & Co. KG, Dresden (DE)

( * ) Notice: Subject to any disclaimer, the term of this patent is extended or adjusted under 35 U.S.C. 154(b) by 312 days.

(21) Appl. No.: 11/292,948

(22) Filed: Dec. 2, 2005

(65) Prior Publication Data

US 2007/0130449 A1    Jun. 7, 2007

(51) Int. Cl.
*G06F 11/00* (2006.01)
(52) U.S. Cl. ..................................... 712/220
(58) Field of Classification Search ................. 712/220, 712/225, 227, 244; 714/5, 718, 42, 763; 710/269
See application file for complete search history.

(56) References Cited

U.S. PATENT DOCUMENTS

| 3,576,982 | A | | 5/1971 | Duke |
| 4,072,852 | A | | 2/1978 | Hogan et al. |
| 4,621,364 | A | * | 11/1986 | Tschoepe ..................... 714/54 |
| 4,761,734 | A | | 8/1988 | Van Meerbergen |
| 5,602,987 | A | * | 2/1997 | Harari et al. ..................... 714/8 |
| 5,646,948 | A | * | 7/1997 | Kobayashi et al. ........... 714/719 |
| 6,035,432 | A | * | 3/2000 | Jeddeloh ....................... 714/763 |
| 6,130,836 | A | * | 10/2000 | Matsubara et al. ...... 365/185.03 |
| 6,625,749 | B1 | * | 9/2003 | Quach ........................... 714/10 |
| 6,728,164 | B2 | * | 4/2004 | Mori ........................ 365/238.5 |
| 6,842,811 | B2 | * | 1/2005 | Barry et al. .................. 710/260 |
| 7,277,979 | B2 | * | 10/2007 | Yada et al. .................... 711/103 |
| 2003/0093654 | A1 | * | 5/2003 | Harris ......................... 712/220 |
| 2004/0190330 | A1 | * | 9/2004 | Iwata .......................... 365/149 |

FOREIGN PATENT DOCUMENTS

| EP | 0 359 849 A1 | 3/1990 |
| FR | 2 740 235 | 4/1997 |

\* cited by examiner

*Primary Examiner*—Eric Coleman
(74) *Attorney, Agent, or Firm*—Slater & Matsil, L.L.P.

(57) ABSTRACT

A processing arrangement (1) includes a processing unit (3) adapted to execute a predetermined set of processing instructions received from an instruction input (12). The set of processing instructions includes at least one predetermined processing instruction adapted to initiate a fixing operation. A memory unit (2) with a multiplicity of memory cells (5) is adapted to store data values. A detection unit (6) is adapted to detect a data value of a memory cell (5) and a data output (7) adapted to provide, on successful detection, the detected data value of a memory cell (5) or, on unsuccessful detection, a predetermined data value to the data output (7). The data output (7) is operationally coupled to the instruction input (12). The predetermined data value is mapped to the predetermined processing instruction adapted to initiate the fixing operation of an execution through the processing unit (3).

21 Claims, 5 Drawing Sheets

FIG 4

| Address | Instruction | Data | |
|---|---|---|---|
| 000 | NOP | 000 | ⎫ |
| 001 | NOP | 000 | ⎬ 41 |
| 010 | NOP | 000 | ⎪ |
| 011 | NOP | 000 | ⎭ |
| 100 | ... | | ⎫ |
| 101 | ... | | ⎬ 42 |
| 110 | ... | | ⎪ |
| 111 | ... | | ⎭ |

PROCESSING ARRANGEMENT, MEMORY CARD DEVICE AND METHOD FOR OPERATING AND MANUFACTURING A PROCESSING ARRANGEMENT

TECHNICAL FIELD

The invention relates to a processing arrangement, memory card device and method for operating and manufacturing a processing arrangement.

BACKGROUND

Processing arrangements comprising a processing unit and a memory unit are widely known. For example, most electronic devices such as computers or consumer electronic devices comprise a microprocessor and a BIOS (basic input output system) memory unit comprising processing instructions performed after providing the microprocessor with an operating voltage, i.e., after switching the device on.

Another example of processing arrangements of the described kind are memory card devices such as flash memory cards, in which a non-volatile memory unit is accessed by means of an integrated microcontroller acting as processing unit.

During startup and operation of such processing arrangements temporary problems or faults can occur. For example, it may take more time for the memory unit to become operational than it takes for the processing unit.

A processing unit receiving no data or an unexpected data value from a memory unit due to a temporary fault will typically perform some unwanted operation, often resulting in a malfunctioning of the entire processing arrangement.

For example, a memory card device trying to access its memory unit after connection of the device to a host system may crash, because a power supply from the host system to the memory card device is not stable at the time of the first access. As a consequence, the memory card device may not respond as expected by the host system and is unavailable for storing, receiving or sending data.

In order to overcome such and similar problems, one can design a separate detection circuit that is capable of detecting a temporary fault or error. On detection, the detection circuit can then stop the processing unit, for example by providing a suitable control signal to it or by stopping a clock signal of the processing arrangement.

However, such detection circuits require additional electronic components and thus space in the processing arrangement. As a consequence, the processing arrangement becomes more complex and thus more expensive.

Another disadvantage of such a solution is that it cannot be changed after the design of the processing arrangement has been completed. For example, it is impossible to introduce new fixing operations for responding to a detected temporary problem after the design stage of the processing arrangement.

In one aspect, the present invention describes a processing arrangement with a simple and flexible design that is capable of performing a fixing operation. In a further aspect, the invention provides a memory card device with a simple and flexible design that is capable of performing a fixing operation. In yet another aspect, the invention describes methods for manufacturing and operating processing arrangements in accordance with the invention.

SUMMARY OF THE INVENTION

According to a first embodiment of the invention, a processing arrangement is provided comprising a processing unit adapted to execute a predetermined set of processing instructions received from an instruction input, the set of processing instructions including at least one predetermined processing instruction adapted to initiate a fixing operation, and a memory unit with a multiplicity of memory cells adapted to store data values, a detection unit adapted to detect a data value of a memory cell and a data output adapted to provide, on successful detection, the detected data value of the memory cell, or, on unsuccessful detection, a predetermined data value to the data output, the data output being operationally coupled to the instruction input, wherein the predetermined data value is mapped to the predetermined processing instruction adapted to initiate the fixing operation upon execution through the processing unit.

By mapping the predetermined data value to a processing instruction of the processing unit that is adapted to initiate a fixing operation, a fixing operation is initiated automatically upon reception of the predetermined data value. Consequently, the processing arrangement initiates a fixing operation in the case of an unsuccessful detection operation of the memory unit without a need for separate circuit components.

According to an advantageous embodiment of the first aspect, the predetermined processing instruction is a wait instruction and the processing unit waits for a predetermined amount of time on reception of the predetermined data value mapped to the wait instruction.

By mapping the predetermined data value, which may, for example, indicate a temporary problem to a wait instruction of the processing unit, the processing unit automatically waits on reception of the predetermined data value. Consequently, no additional control signals must be provided in order to halt the processing unit until the memory unit has recovered from the temporary problem.

According to a further advantageous embodiment of the first aspect, the predetermined processing instruction is a jump instruction and the processing unit performs a jump to a predetermined address on reception of the predetermined data value mapped to the jump instruction.

By mapping the predetermined data value to a processing instruction for a jump, a jump is performed automatically upon provision of the predetermined data value, for example on occurrence of a temporary error. In this way, processing instructions used to perform a fixing operation can be activated by jumping to processing instructions corresponding to the fixing operation.

According to a further advantageous embodiment of the first aspect, the detection unit comprises a multiplicity of detectors and the fixing operation is adapted to test the functioning of at least one predetermined detector.

By adapting the fixing operation to test the functioning of one or several detectors included in the memory unit, a systematic testing of the memory unit can be performed as part of the fixing operation in order to guarantee the proper working of the memory unit.

According to a second aspect of the present invention a processing arrangement, comprising a processing unit operationally connected to a memory unit is provided. The memory unit is adapted to store processing instructions for the processing unit and to provide a predetermined data value to the processing unit if a processing instruction could not be retrieved from the memory unit, wherein the predetermined data value is mapped to a processing instruction causing the processing unit to initiate a fixing operation.

By providing a processing arrangement with a memory unit adapted to store and provide processing instructions to a processing unit and by providing a predetermined data value mapped to a processing instruction causing the processing unit to initiate a fixing operation, the data value provided from the memory unit to a processing unit will always effect a controlled action of the processing unit. In case the memory unit is working correctly, processing instructions stored in the memory unit are executed by the processing arrangement. If, however, the memory unit does not operate correctly, the data value mapped to the processing instruction causing the processing unit to initiate a fixing operation is executed instead.

According to an advantageous embodiment of the second aspect, the fixing operation includes a delay loop. By including a delay loop in the fixing operation, the memory unit gains some extra time that can be used, for example, to overcome temporary problems.

According to an advanced embodiment of the second aspect of the present invention the memory unit includes a non-volatile memory. By including a non-volatile memory in the processing arrangement, processing instructions stored in the non-volatile memory unit can be used during startup of the processing arrangement.

According to a further advantageous embodiment of the second aspect, the memory unit includes a first set of processing instructions adapted to perform the fixing operation if the processing instructions of the first set are executed by the processing unit. By including a first set of processing instructions in the memory unit, the processing instructions required to perform the fixing operations can be stored in the same memory unit normally used as data store for the processing arrangement. Consequently, no additional memory unit is required to store the processing instruction for the fixing operation.

According to a further advantageous embodiment of the second aspect, the memory unit further includes a second set of processing instructions adapted to perform a predetermined operation if the processing instructions of the second set are executed by the processing instruction.

According to a further advantageous embodiment of the second aspect, the first and second set of processing instructions are interspersed. By including first and second sets of processing instructions in the memory unit, all processing instructions required for performing the predetermined operation, for example a user operation of the processing arrangement, and the fixing operation can be stored in the processing arrangement. Interspersing the first and second set allows an efficient use of a storage capacity of the memory unit.

According to a third aspect of the present invention, a memory card device is provided, including a non-volatile memory unit, a processing unit and an interface, the memory unit being operationally coupled to the interface by means of the processing unit, wherein the processing unit and the memory unit form a processing arrangement according to the first or second aspect of the invention. By integrating a processing arrangement according to the first or second aspect into a memory card device, a memory card device that is capable of recovering from temporary problems is provided.

According to a fourth aspect of the present invention a method for operating a processing arrangement is provided. The processing arrangement includes a processing unit operationally coupled to a memory unit. The method comprises the steps of requesting a data value from the memory unit, transmitting the requested data value or a predetermined data value from the memory unit to the processing unit and performing a fixing operation by the processing unit on reception of the predetermined data value. By performing a fixing operation on reception of a predetermined data value, a processing unit can respond to a predetermined data value in a predetermined way during operation.

According to an advantageous embodiment of the fourth aspect, the fixing operation includes an initialization of the processing arrangement. By performing an initialization as part of the fixing operation, the processing arrangement can initialize itself, for example on detection of a temporary error.

According to a further advantageous embodiment of the fourth aspect, the fixing operation includes a recovery operation adapted to restore a state of the processing unit. By performing an recovery operation as part of the fixing operation, the processing unit can be restored to a defined state, for example the state in which it was immediately before an occurrence of a temporary fault.

According to a fifth aspect of the present invention, a method for manufacturing a processing arrangement is provided. The method includes the steps of providing a set of processing instructions, at least one predetermined processing instruction being adapted to initiate a fixing operation, providing a processing unit adapted to execute the set of processing instruction, providing a memory unit adapted to store data values, the memory unit being adapted to transmit a data value stored in the memory unit or a predetermined data value to a data output, and mapping the predetermined data value to the predetermined processing instructions adapted to initiate a fixing operation.

According to the method the predetermined processing arrangement can be designed and manufactured, which is adapted to perform a method in accordance with the fourth aspect of the invention.

Further details and embodiments of the invention are described in the patent claims.

The invention will be described in more detail using embodiments with reference to the figures described below.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 depicts a diagram showing the memory content of a processing arrangement according to a third embodiment;

Figure 1:
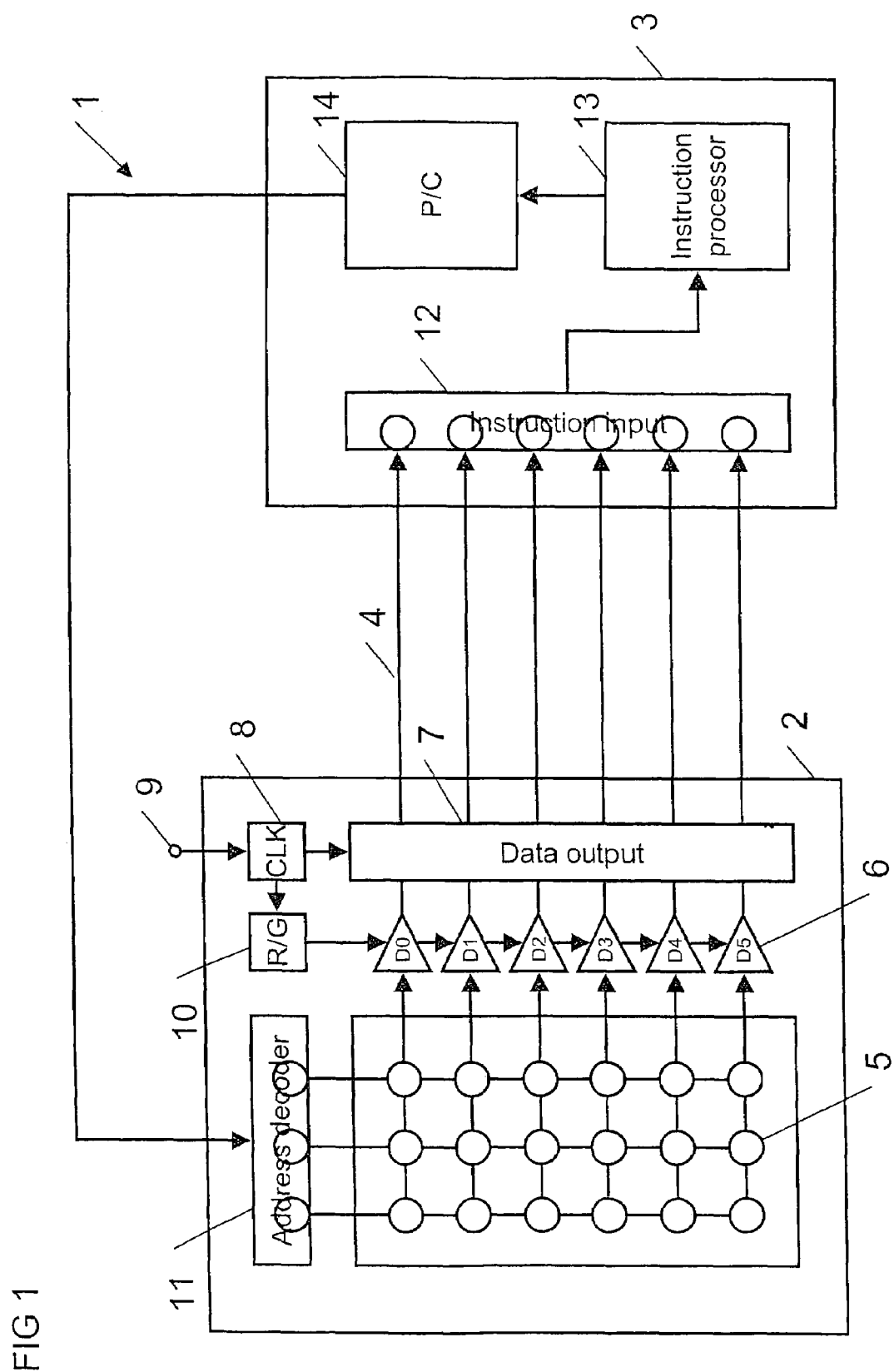
FIG. 1 depicts a schematic diagram of a processing arrangement.

The following list of reference symbols can be used in conjunction with the figures:

1 processing arrangement
2 memory unit
3 processing unit
4 data bus
5 memory cell
6 detection unit
7 data output
8 internal clock signal generator
9 clock input
10 reference generator
11 address decoder
12 instruction input
13 instruction processor
14 program counter
21 first set of processing instructions
22 second set of processing instructions
31 first set of processing instructions
32 second set of processing instructions
41 first set of processing instructions
42 second set of processing instructions 51-56 method steps
61-65 method steps

DETAILED DESCRIPTION OF ILLUSTRATIVE EMBODIMENTS

FIG. 1 shows a schematic diagram of a processing arrangement 1. The processing arrangement comprises a memory unit 2 and a processing unit 3 connected by means of a data bus 4.

The memory unit 2 comprises a matrix of memory cells 5, six detection units 6, one for each sense amplifier of the matrix, and a data output 7. The memory unit 2 further comprises an internal clock signal generator 8, receiving an external clock signal CLK from a clock input 9. An internal clock signal provided by the internal clock signal generator 8 is provided to the data output 7 and a reference generator 10. The reference generator 10 provides a reference current or voltage to the detection units 6. In addition, the memory unit 2 comprises an address decoder 11 used to select one or several of the memory cells 5 for detection through the detection units 6.

The processing unit 3 comprises an instruction input 12, an instruction processor 13 and a program counter 14. The instruction processor 13 is operationally connected with the instruction input 12 and controls the program counter 14.

In addition, the program counter 14 is operationally connected to the address decoder 11, and set up to provide an address to the memory unit 2, at which a processing instruction to be executed by the processing unit 3 during a subsequent processing cycle is stored. The address decoder 11 is used to decode the address and select a corresponding memory cell 5.

If the content of a selected memory cell 5 can be detected by the detection unit 6 successfully before a subsequent request is issued to the address decoder 11 or a subsequent clock pulse is provided by the internal clock signal generator 8, the detected content of the memory cell 5 is provided to the data output 7. From there the detected data value is transmitted to the instruction input 12 of the processing unit 3 by means of the data bus 4.

If, however, the detection of the content of a memory cell 5 by the detection unit 6 is not completed successfully at the time a subsequent request is received by the address decoder 11 or a subsequent clock pulse is received from the internal clock signal generator 8, the data output 7 is reset. In such a case, the memory unit 2 provides a predetermined and consequently predictable data value. For example, a flash memory unit 2 may provide a predefined logic level on all data outputs in case a built-in detection unit 6 is unable to complete a read request successfully.

For example, all transistors used in a circuit design of the data output 7 may be reset such that the memory unit 2 outputs a logical high value on all data lines of the data bus 4. In this way a predetermined data value is provided by the memory unit 2 and transmitted to the instruction input 12 of the processing unit 3.

In a first embodiment of the invention, the memory unit 2 is adapted to provide a logical high value on all data lines connected to its data output 7.

According to the example, the memory unit 2, the data bus 4 and the processing unit 3 of the processing arrangement 1 uses six bit data values. The first three bits of each data value are used to encode a processing instruction to be executed by the processing unit 3, whereas the remaining three bits are used to encode an address or a data value for the specified processing instruction.

In the specified example, the data value "111111" provided by the memory unit 2 on unsuccessful detection of a data value stored in a memory cell 5 is thus interpreted by the processing unit 3 as a "jump" processing instruction (JMP) to the last address 111 of the memory unit 2.

Figure 2:
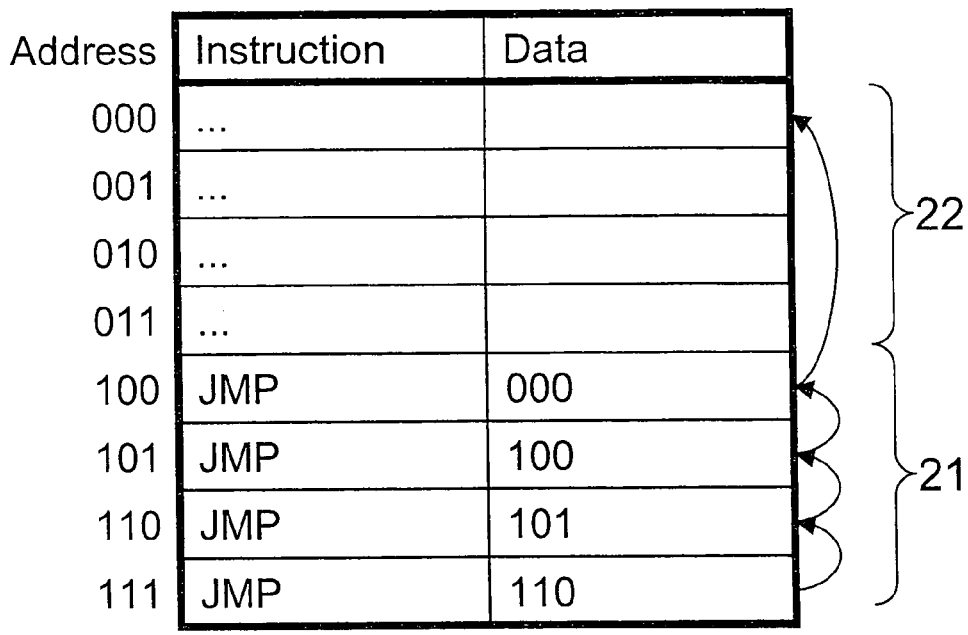
FIG. 2 depicts a diagram showing the memory content of a processing arrangement according to a first embodiment.

FIG. 2 shows a schematic diagram of the memory contents of the memory unit 2 in accordance with the first embodiment of the invention. The memory unit 2 comprises a first set of processing instructions 21 stored at addresses 100 to 111. At address 111, the last address of the memory unit 2, a processing instruction for jumping to the second last address 110 is stored. At the second last address, a processing instruction for a jump to the address 101, immediately preceding the second last address, is stored. At the address 101 a processing instruction for a jump to the address 100 preceding this address is stored. At the address 100 a jump to the first address 000 is stored. A second set of processing instruction 22, here including the addresses 000 to 011, is used for storing processing instructions for another operation, for example for the execution of a user functions of the processing arrangement 1.

In case of a temporary error, for example during startup of the processing arrangement 1, the memory unit 2 provides the predetermined data value "111111" to the processing unit 3. The processing unit 3 receives this data value at its instruction input 12 and decodes the received data value as an instruction for the instruction processor 13. In the specified case, the instruction processor 13 receives a jump instruction to the last address 111 of the memory unit 2. As a consequence, the program counter 14 is set to the address 111, which is subsequently requested from the memory unit 2.

As long as the memory unit 2 is unable to retrieve the requested data value, it will always provide the predetermined data value "111111" by means of its data output 7 over the address bus 4 to the instruction input 12 of the processing unit 3. Consequently, as long as the memory unit is in an erroneous state, the processing arrangement 1 will remain in this delay loop.

As soon as at least the detection unit 6 corresponding to the least significant bit of the data bus 4 becomes available for normal operation, the memory unit 2 is capable of detecting the data value actually stored at the address 111. The data value stored there, the value "111110", is then transferred to the data output 7 and transmitted to the instruction input 12. As a consequence, the instruction processor 13 performs a jump instruction to the second last address 110. Again the corresponding address is transferred to the program counter 14 and the address decoder 11 for requesting the data value stored at the corresponding address 110.

If the memory unit 2 and at least the detection unit 6 corresponding to the second least significant bit of the data value to be read from the selected memory cell 5 is ready for operation, the instruction code for jumping to address 101, i.e., the data value "111101", will be transferred to the data output 7 of the memory unit 2. If, however, the second last detection unit 6 is still not ready for operation, the erroneous processing instruction jump JMP 111 will be output to the data output 7 and transferred to the instruction input 12. Consequently, the processing unit 2 will load the content of the memory unit stored at address 111 again and start the delay ioop again, until the second last detection unit 6 is also available for normal operation.

In the presented embodiment shown in FIG. 2, the proper working of the two detection units 6 corresponding to the two least significant bits is tested by a further jump processing instructions, i.e., a jump to the address 100. If the detection units 6 corresponding to the two least significant bits of the detected data value are working properly, the content of the memory cell 5 with address 100 will by loaded into the instruction input 12.

For the purpose of this example, it is assumed that this indicates a sufficient level of confidence that by this time all detection units 6 are ready for operation. In practice, the required level of confidence may be adjusted by modifying the first set of processing instruction 21 used for the described fixing operation.

As last processing instruction of the first set of processing instructions 21 comprising the fixing operation, the jump processing instruction stored at address 100 of the memory unit 2, i.e. a processing instruction for a jump to address 000 is read successfully, and, consequently, the instruction processor 13 is filled with this jump command and the program counter 14 is filled with the address 000. Finally, the execution of the processing instruction of the second set 22 stored at address 000 and subsequent addresses can begin. Usually, this address range is used for some operation specific to the processing arrangement 1 and may comprise processing instructions for initializing the processing arrangement 1.

By mapping the predetermined data value "111111" of the memory unit 2 to a processing instruction used for performing a jump to a predetermined address (JMP 111) and by providing a first set of processing instructions 21 comprising a sequence of jump instructions as shown in FIG. 2 and described above, a delay loop is implemented that systematically tests the detection units 6 of the memory unit 2. Once a predetermined level of confidence in the proper functioning of the memory unit 2 is reached, in the given example the proper working of three detection units 6, the processing unit 3 starts the execution of the second set of processing instructions 22 stored at the beginning of the memory unit 2. In this way, the processing arrangement 1 is adapted to respond to a temporary problem of the memory unit 2 by firstly executing a delay loop and, secondly, restarting the processing arrangement 1 by performing instructions stored at its start address.

Figure 3:
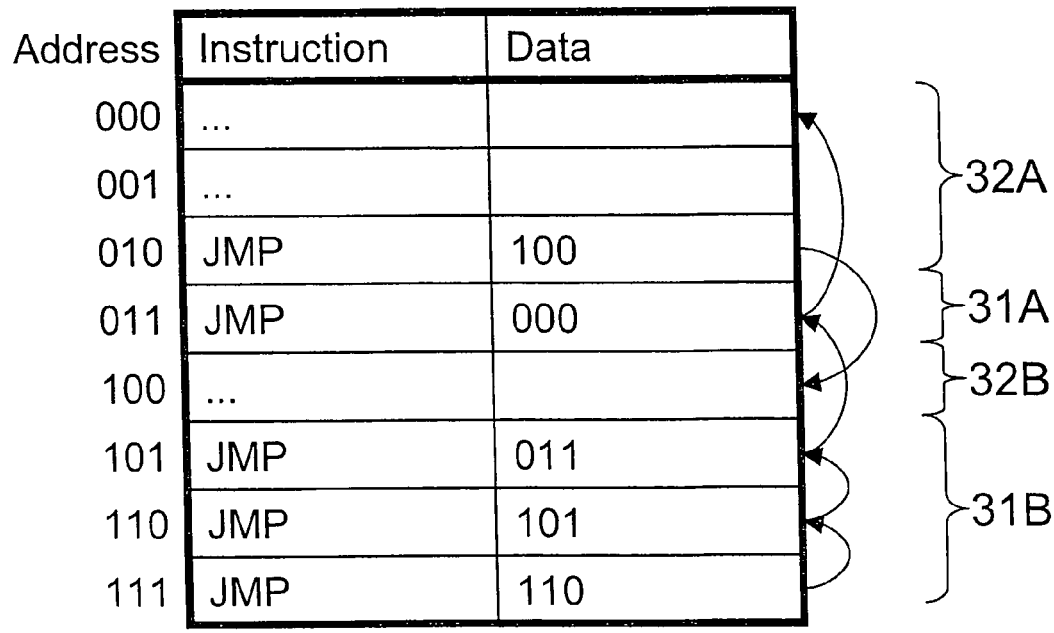
FIG. 3 depicts a diagram showing the memory content of a processing arrangement according to a second embodiment.

FIG. 3 shows the memory content of a second embodiment in accordance with the invention. Again the predetermined data value transmitted from the memory unit 2 to the processing unit 3 in case of a temporary fault is assumed to be "111111". This corresponds, again, to a jump to the last address of the memory unit 2 (JMP 111).

The memory unit 2 includes a first set of processing instructions 31, used to implement a fixing operation and a second set of processing instructions 32 used to implement a predetermined operation. Unlike in the embodiment shown in FIG. 2, the first and the second sets 31 and 32 are interspersed, such that they both include a first part 31A and 32A and a second part 31B and 32B, respectively.

Again, the first set of processing instructions 31 include jump processing instructions to the addresses 110 and 101 at the last and second last address of the memory unit 2, respectively. However, this time the processing instruction stored at the address 101 of the memory unit 2 is a processing instruction for jumping to the address 011.

Consequently, this instruction and, thus the fixing operation it is part of, is adapted to test the proper working of the detection unit 6 corresponding to the third least significant data bit of the data bus 4. Consequently, in this embodiment, the jump to the address 000 used to initialize the processing arrangement 1 is stored at the address 011 in the first part 31A of the first set of processing instructions 31.

By testing one detection unit 6 after another and also independent from one another, the proper operation of each detection unit 6 can be verified before the final jump to the start address 000 of the second set of processing instructions 32 stored in the memory unit 2 is performed. As a consequence of this individual testing of detection units 6, the second set of processing instructions 32 of the memory unit 2 is divided by the first part 31A of the first set of processing instructions 31 forming the delay loop. In the given example, the remaining address space is divided into the first part 32A and a second part 32B. These parts 32A and 32B can be combined by a jump processing instruction stored as last processing instruction of the first part 32A to the second set of processing instruction 32, for example.

It is important to notice that, in the example shown in FIG. 3, the size of the first set of processing instructions 31 required to reach a predetermined confidence level grows linearly with the width of the data value to be detected. It does not, however, grow with the capacity of the memory unit 2, as is the case in most error correction schemes according to the prior art. Thus, for all practical purposes the size of the first set of processing instructions 31 is constant and small in comparison with the capacity of the memory unit 2.

Although in the examples presented in FIG. 2 and FIG. 3, respectively, the differences between the first kind of the delay loop shown in FIG. 2 and the second kind of the delay loop shown in FIG. 3 are only minor, in general they will result in very different contents of the memory unit 2. This is due to the typically much bigger data widths of the processing arrangement 1 in practice than can be shown for reasons of simplicity here. Particularly, the delay loop shown in FIG. 2 always results in one continuous set of processing instructions 21. Instead, the second kind of delay loop shown in FIG. 3 results in a partitioned first set of processing instructions 31.

Although in the embodiments presented in FIGS. 2 and 3, respectively, a jump processing instruction was used by means of example, other processing instructions such as subroutine calls, conditional branches or similar processing instructions may be used to the same effect.

FIG. 4 shows a third embodiment of the present invention. In this embodiment, the memory unit 2 is adapted to provide a low logical value on all lines of the data output 7 in case of a temporary error. In the presented example, the predetermined data value "000000" is mapped to a predetermined processing instruction NOP used to denote the "no operation" processing instruction.

Upon reception of the NOP processing instruction, the processing unit 3 will perform no other action than incrementing the program counter 14 by one.

The first four addresses of the memory unit 2 are filled with the data value "000000" corresponding to the NOP processing instruction, forming a first set of processing instructions 41. Thus, whether or not the memory unit 2 is ready to read the contents of the first four memory cells 5, the output from the memory unit 2 to the processing unit 3 will in either case be the data value "000000". Consequently, the processing unit 3 will perform no action other than incrementing the program counter 14 from 0 to 4 during the first four cycles of the operation of the processing arrangement 1.

For this embodiment, it is assumed that after four cycles the memory unit 2 will be ready for normal operation with the required level of confidence. Consequently, in the fifth cycle of the processing arrangement 1 the detection units 6 will be ready to read the contents of the memory cells 5 associated with the address 100 of the memory unit 2. At this address a second set of processing instructions 42 begins, which contains the processing instruction used for a predetermined operation of the processing arrangement 1. As a consequence, the processing arrangement 1 becomes independent of temporary faults during startup of the memory unit 2.

Although the example presented in FIG. 4 uses the NOP instruction to perform a fixing operation, other processing instructions could be used as well. For example, all arithmetic operations like adding or subtracting could be used as long as their outcome does not affect the proper operation of the second set of processing instructions 42. Alternatively, or in addition, a special processing instruction can be provided for the processing unit 3, which performs some specific fixing operation such as waiting a predetermined amount of time without incrementing the program counter 14.

Figure 5:
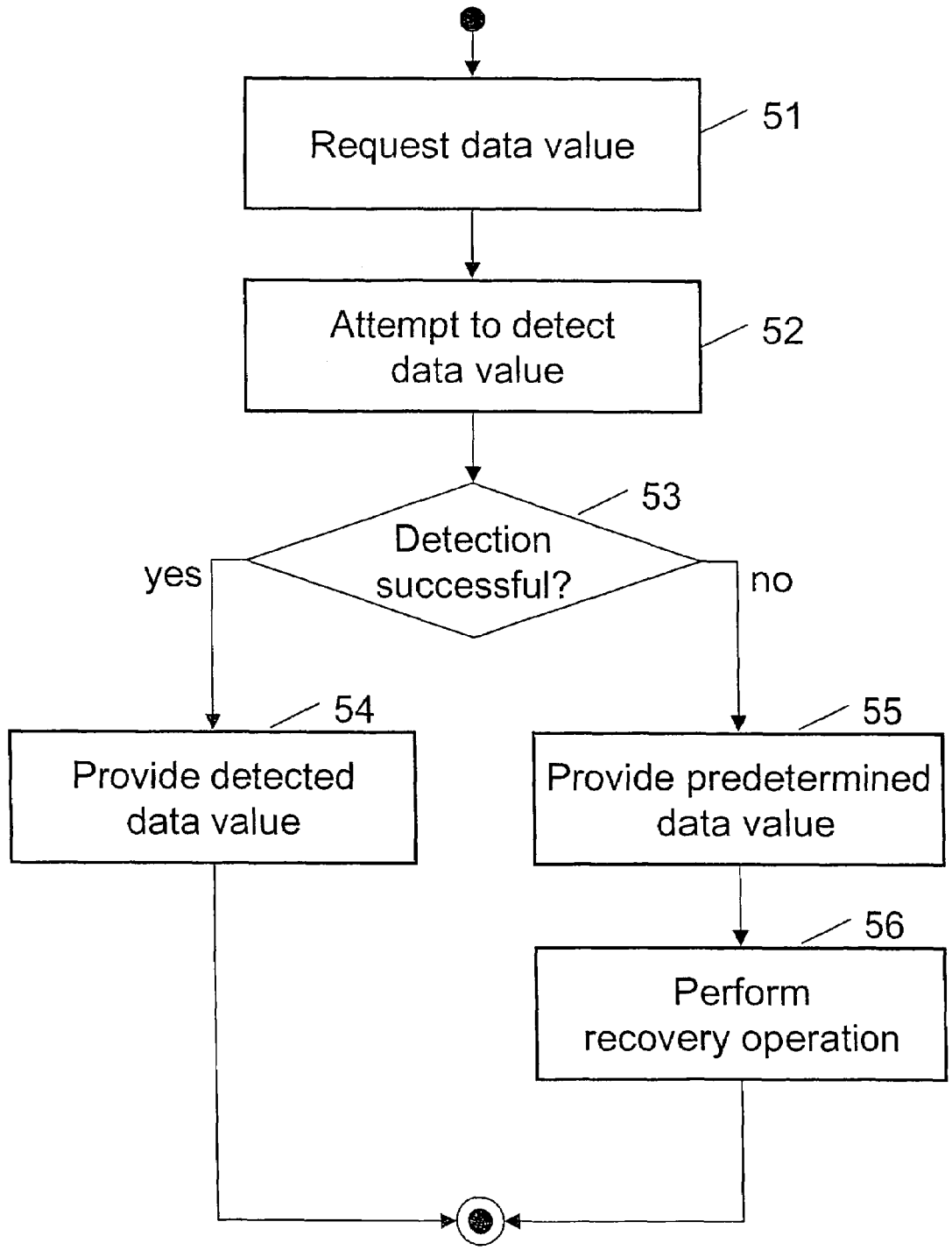
FIG. 5 depicts a flow diagram for a method for operating a processing arrangement.

FIG. 5 shows a flow diagram for a method for operating a processing arrangement 1 in accordance with embodiments of the invention.

In a first step 51, the processing unit 3 requests a data value from the memory unit 2. For example, an address corresponding to one or several predetermined memory cells 5 stored in the program counter 14 may be transferred to the address decoder 11. In addition or alternatively, the request may be triggered by providing a clock signal CLK to the clock input 9 of the memory unit 2.

In a step 52, the memory unit 2 attempts to detect the requested data value by means of the detection units 6. For example, sense amplifiers may be used in order to detect the programming state of the memory cells 5 corresponding to the address decoded by the address decoder 11. For this purpose a current through or a voltage across the selected memory cells 5 may be compared with a reference signal generated by the reference generator 10.

Different methods and apparatuses for detecting the programming state of a memory cell 5 are known to a person skilled in the art and can be used in conjunction with the present invention. In particular, a design as presented in FIG. 1 can be used, where several bits are detected in parallel by means of a multiplicity of detection units 6. Alternatively, other designs in which the individual bits forming a requested data value are detected one after another using a single detection unit 6 may be used.

In a step 53, the memory unit 2 determines whether the detection was successfully completed. For example, a built-in control circuit could check whether a data value was detected by the detection unit 6 and transmitted to the data output 7. Alternatively, the memory unit 2 could be designed to reset all data lines connected to the data output 7 with each received change of the clock signal CLK.

Cases in which the detection fails include, among others, insufficient time for detection, for example, in case a subsequent signal is received by the address decoder 11 or the clock input 9, or insufficient supply voltage, e.g., if a high voltage source (not shown) included in the memory unit 2 is not fully operational at the time of detection.

If the detection was successfully performed, in a step 54, the memory unit 2 transmits the requested data value comprising the contents of the addressed memory cells 5 to the processing unit 3. For example, a previously detected data value stored in the data output 7 may be transferred over the data bus 4 to the processing input 12 of the processing unit 3.

The received data value may correspond to a specific processing instruction to be executed by the instruction processor 13. For example, the processing instruction may be part of a second set of processing instructions 22, 32 or 42 used to perform a predetermined operation of the processing arrangement 1.

If the detection is determined to be unsuccessful, in a step 55, the memory unit 2 transmits a predetermined data value to the processing unit 3. For example, if a subsequent clock signal CLK is received by the clock input 9, electronic gates included in the data output 7 may be reset, resulting in a logical high value to be provided to all signal lines of the data bus 4, i.e., a predetermined data value of "111111" as in the first and second embodiments described above.

In accordance with an embodiment, this predetermined data value is mapped to a predetermined processing instruction by the processing unit 3. For example, the instruction input 12 may include means for decoding the received predetermined data value and activating the predetermined processing instruction of the instruction processor 13. As shown in FIGS. 2, 3 and 4 and described above, the predetermined processing instruction may include a subroutine call instruction, a jump instruction, a delay instruction, a no operation instruction or any other instruction adapted to initiate a fixing operation.

In a step 56, a fixing operation is performed by the processing unit 3. A fixing operation may be any individual processing instruction, sequence of processing instruction including an empty sequence or any other functionality initiated by the processing unit 3 that is suitable to overcome a temporary problem of the processing arrangement 1. For example the processing unit 3 may execute a delay loop as detailed in FIG. 2 or 3. Alternatively, the processing unit 3 may just halt further processing for a predetermined amount of time or clock cycles until the memory unit 2 becomes operational as indicated in FIG. 4. The processing unit 3 may also provide a purpose designed processing instruction that is adapted to recover a predetermined state of the processing unit 3, to halt the processing unit 3 or perform some other kind of fixing operation.

The method detailed above may be used in conjunction with any processing arrangement 1 comprising a memory unit 2 and a processing unit 3. It can be used, for example, for multi-bit flash memory units 2 used in memory card devices. Due to their internal structure and the increasingly low supply voltages used in modern devices, flash memory units require an internal high voltage source, which may require additional time during start-up to become fully operational. However, the method may also be used with other types of memory units, for example SRAM, RAM, ROM, PROM, EPROM or EEPROM.

Figure 6:
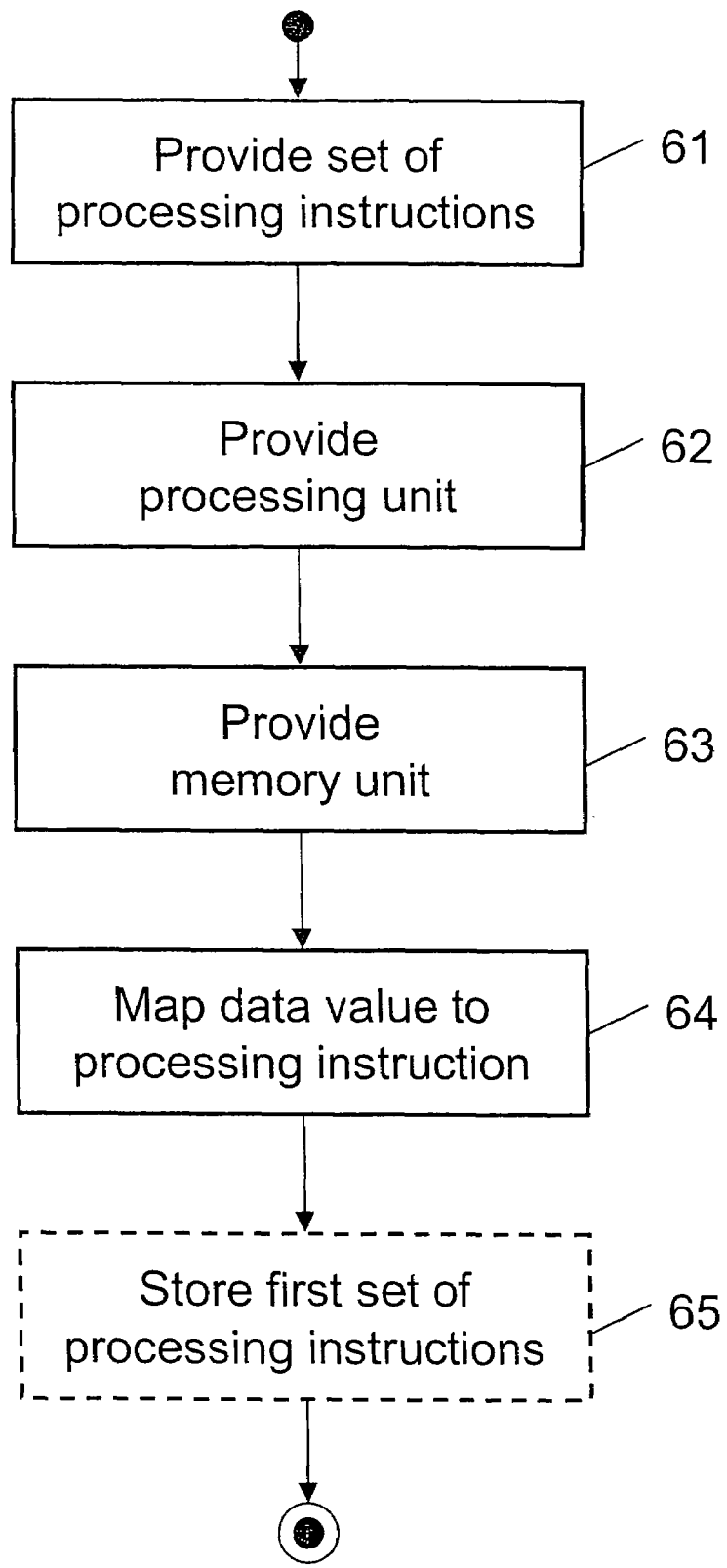
FIG. 6 depicts a flow diagram for a method for manufacturing a processing arrangement.

FIG. 6 shows a flow diagram for a method for manufacturing a processing arrangement 1.

In a first step 61, a set of processing instructions is provided. The set includes at least one predetermined processing instruction suitable to initiate a fixing operation. The predetermined processing instruction may be a jump (JMP) or no operation (NOP) processing instruction, for example. In a further step 62, a processing unit 3 is provided that is adapted to execute the set of processing instructions provided in step 61.

In a step 63, a memory unit 2 is provided. The memory unit 2 is adapted to store data values and to return data values on request. If a request can be performed successfully, a data value stored in the memory unit 2 is returned. If a request cannot be performed successfully, for example, because of an occurrence of a temporary fault, a predetermined data value is returned.

In a step 64, the predetermined data value of the memory unit 2 is mapped to the predetermined processing instruction adapted to initiate the fixing operation. Steps 61 to 64 are typically performed at a design stage for a processing arrangement 1. Consequently, the steps may be performed in a repetitive way, in any order or in parallel.

In an optional step 65, a first set of processing instructions 21, 31, 41 is stored in the memory device 2. The first set of processing instructions 21, 31, 41 may be used to implement fixing operations including a multiplicity of processing instructions such as the delay loops shown in the FIGS. 2, 3 and 4. Step 65 may be performed during manufacturing, for example durning pre-loading firmware to a processing arrangement 1. Alternatively, step 65 may be performed during operation of the processing arrangement 1, for example by copying processing instructions from a non-volatile memory to a volatile memory unit 2 during startup.

What is claimed is:

1. A processing arrangement comprising:
   a processing unit adapted to execute a predetermined set of processing instructions received from an instruction input, the set of processing instructions comprising at least one predetermined processing instruction adapted to initiate a fixing operation;

a memory unit with a multiplicity of memory cells adapted to store data values;

a detection unit adapted to detect a data value of a memory cell; and a data output adapted to provide, on successful detection, the detected data value of the memory cell, and on unsuccessful detection, a predetermined data value to the data output, the data output being operationally coupled to the instruction input, wherein the predetermined data value is mapped to the predetermined processing instruction adapted to initiate the fixing operation upon execution through the processing unit.

2. The processing arrangement according to claim 1, wherein the predetermined processing instruction comprises a wait instruction, and the processing unit is configured to wait a predetermined amount of time on reception of the predetermined data value mapped to the wait instruction.

3. The processing arrangement according to claim 1, wherein the predetermined processing instruction comprises a jump instruction and the processing unit is adapted to perform a jump to a predetermined address on reception of the predetermined data value mapped to the jump instruction.

4. The processing arrangement according to claim 1, wherein the detection unit comprises a multiplicity of detectors and the fixing operation is adapted to test the functioning of at least one predetermined detector.

5. A processing arrangement comprising:

a memory unit; and a processing unit operationally coupled to the memory unit, the memory unit being adapted to store processing instructions for the processing unit and to provide a predetermined data value to the processing unit if a processing instruction could not be retrieved from the memory unit, wherein the predetermined data value is mapped to a processing instruction causing the processing unit to initiate a fixing operation.

6. The processing arrangement according to claim 5, wherein the fixing operation comprises a delay loop.

7. The processing arrangement according to claim 5, wherein the memory unit comprises a non-volatile memory.

8. The processing arrangement according to claim 7, wherein the memory unit comprises a first set of processing instructions adapted to perform the fixing operation if the processing instructions of the first set are executed by the processing unit.

9. The processing arrangement according to claim 8, wherein the memory unit further comprises a second set of processing instructions adapted to perform a predetermined operation if the processing instructions of the second set are executed by the processing unit.

10. The processing arrangement according to claim 9, wherein the first and second sets of processing instructions are interspersed.

11. A memory card device comprising:

an interface;

a processing unit; and a non-volatile memory unit, the memory unit being operationally coupled to the interface by means of the processing unit, wherein the memory unit is adapted to store processing instructions for the processing unit and to provide a predetermined data value to the processing unit if a processing instruction could not be retrieved from the memory unit, wherein the predetermined data value is mapped to a processing instruction causing the processing unit to initiate a fixing operation.

12. The memory card device according to claim 11, wherein the fixing operation comprises a delay loop.

13. The memory card device according to claim 11, wherein the memory unit comprises a first set of processing instructions adapted to perform the fixing operation if the processing instructions of the first set are executed by the processing unit.

14. The memory card device according to claim 13, wherein the memory unit further comprises a second set of processing instructions adapted to perform a predetermined operation if the processing instructions of the second set are executed by the processing unit.

15. The memory card device according to claim 14, wherein the first and second sets of processing instructions are interspersed.

16. A method for operating a processing arrangement that comprises a processing unit operationally coupled to a memory unit, the method comprising:

requesting a data value from the memory unit;

transmitting the requested data value from the memory unit to the processing unit when the requested data value can be retrieved from the memory unit;

transmitting a predetermined data value from the memory unit to the processing unit when the requested data value cannot be retrieved from the memory unit; and performing a fixing operation by the processing unit upon reception of the predetermined data value.

17. The method according to claim 16, wherein the predetermined data value is decoded as a jump instruction, and performing the fixing operation comprises requesting a processing instruction from a predetermined address comprised in the memory unit.

18. The method according to claim 16, wherein the fixing operation comprises an initialization of the processing arrangement.

19. The method according to claim 16, wherein the fixing operation comprises a recovery operation adapted to restore a state of the processing unit.

20. A method for forming a processing arrangement, the method comprising:

providing a set of processing instructions, at least one predetermined processing instruction being adapted to initiate a fixing operation;

providing a processing unit adapted to execute the set of processing instructions, providing a memory unit adapted to store data values, the memory unit being adapted to transmit a data value stored in the memory unit when the data value can be retrieved from the memory unit and a predetermined data value, when the data value cannot be retrieved from the memory unit, to a data output; and mapping the predetermined data value to the predetermined processing instructions adapted to initiate a fixing operation.

21. The method according to claim 20, further comprising storing a first set of processing instructions adapted to perform the fixing operation in the memory unit.

* * * * *